3,168,443
CHARGING MACHINE FOR FUEL EXCHANGING IN A NUCLEAR REACTOR
Thor Lindheim, Vasteras, Sweden, assignor to Allmanna Svenska Elektriska Aktiebolaget, Vasteras, Sweden, a Swedish corporation
Filed Feb. 12, 1962, Ser. No. 172,505
Claims priority, application Sweden, Feb. 16, 1961, 1,577/61
4 Claims. (Cl. 176—30)

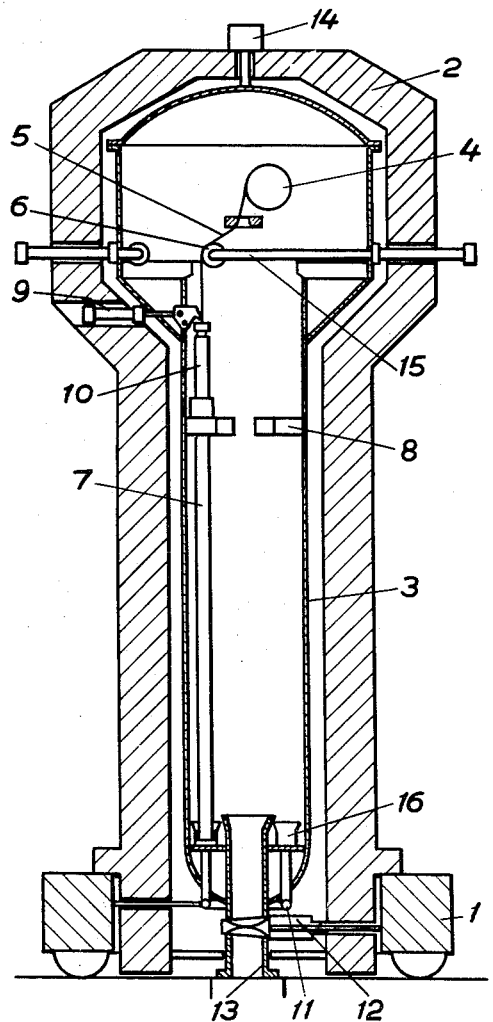

The present invention relates to an arrangement for fuel exchanging in a nuclear reactor at full working pressure in the reactor.

It is of great importance that the fuel assemblies in a heterogeneous reactor may be exchanged even when the reactor is operating at full power. The costs for exchanging will be considerably lower as well as the operational reliability of the whole installation being increased. With such an exchange, however, there are great safety requirements since both the pressure medium in the reactor and the fuel assemblies are highly radioactive and if a leakage occurs, the reactor room may be contaminated, making it impossible for the service personnel to remain there. For a certain time after removal from the reactor, the fuel assemblies must be kept in a cooled space provided with radiation protection, where their heat and radiation energy can slowly diminish without causing damages.

An objection of the invention is to provide means solving these and other problems. The invention comprises outside the reactor a movable charging machine which within a radiation shield takes up a pressure vessel which may be raised or lowered and which is preferably movably suspended at its upper end and at its lower end is provided with a closable central charging opening connectable to the reactor. The fuel assemblies lifted from the reactor by hoist means are in the pressure vessel and they are pushed by positioning means from the central lifting position to peripheral storing positions with coolant supply. The fuel assemblies are supplied with coolant through openings in the bottom of the vessel, so that the coolant washes through the element, thus cooling it.

By concentrating all the essential parts in the top and bottom of the charging machine, these will be easily accessible for inspection and maintenance. The middle part of the charging machine, i.e., the part which is substantially taken up by the fuel elements may be given a compact radiation and thermic protection without apertures or openings. With this construction it is also easy to provide the charging machine with connectable manual operating means as a safety precaution in the event of a current cut or similar fault.

Other objects and advantages of the invention will be described more closely in the following with reference to the accompanying figure which shows schematically in cross section a charging machine according to the invention.

In the figure, 1 designates a trolley which supports the charging machine. 2 designates a radiation protection which surrounds the pressure vessel 3. At 4 there is a lift hoistway, the hoisting cable 5 of which runs over a pulley wheel 6 when a fuel assembly 7 is moved by a movable arm 15 to a peripheral cooling position as shown in the figure. The fuel assembly is suspended by brackets 8 and a liberating arm 9 liberates the gripping means 10 of the hoisting cable. If a gripping means operated by its own weight is used, of course, no liberating arm is necessary. The coolant which washes through the fuel assembly is supplied and led off through the coolant pipe 11. In the connection socket 16 there are valves which are influenced by the fuel assemblies so that they are opened by the weight of the assemblies but are kept closed by a spring and the pressure of the coolant when no assembly is in position. At 12 is a closing valve which can open and close the connection pipe 13 connected to the reactor. The sealing and connection means for the reactor may be carried out in any known way and are not included in the figure. The suspension means 14 lowers and raises the pressure vessel 3 for connection to and disconnection from the reactor, respectively, and further provides a certain flexibility for the pressure vessel which facilitates precision setting when connecting the charging machine to the reactor. The vertical movement is effected for example by means of a screw and a motor-driven nut or by means of a hydraulic or pneumatic operating cylinder. The sideways movement is most easily obtained by suspending the pressure vessel so that it may swing in, for example, a hook or loop.

I claim:
1. Charging machine for exchanging fuel in a nuclear reactor, comprising an outer radiation protecting housing, a pressure vessel inside said housing, means for vertically displacing said pressure vessel relatively to said housing, said pressure vessel comprising means forming a plurality of storing positions stationary with respect to said vessel and provided with coolant supply means, a central closable charging opening connectable to a nuclear reactor, hoist means for the lifting and lowering of fuel assemblies, and positioning means for the displacement of fuel assemblies carried by said hoist means from a central hoist position above said central charging opening to one of said stationary cooled storing positions.

2. Charging machine as claimed in claim 1, said pressure vessel displacing means including means supporting the pressure vessel at its top, said last means allowing pendular movement of said vessel.

3. Charging machine as claimed in claim 1, said pressure vessel having at its lower part openings for circulation of coolant.

4. Charging machine as claimed in claim 1, comprising means for regulating said coolant supply, said means being operatively connected to said storing positions and being operated by fuel assemblies inserted in said storing positions to open said regulating means.

References Cited by the Examiner
UNITED STATES PATENTS
2,850,447  9/58  Ohlinger et al. _____ 176—30
3,051,642  8/62  Dent _____ 176—30

FOREIGN PATENTS
844,765  8/60  Great Britain.

CARL D. QUARFORTH, Primary Examiner.